US008761594B1

(12) United States Patent
Gross et al.

(10) Patent No.: US 8,761,594 B1
(45) Date of Patent: Jun. 24, 2014

(54) SPATIALLY DYNAMIC ILLUMINATION FOR CAMERA SYSTEMS

(71) Applicant: Apple Inc., Cupertino, CA (US)

(72) Inventors: Kevin A. Gross, San Francisco, CA (US); Scott T. Smith, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/781,325

(22) Filed: Feb. 28, 2013

(51) Int. Cl.
G03B 15/03 (2006.01)

(52) U.S. Cl.
USPC .......................................................... 396/155

(58) Field of Classification Search
USPC ............... 396/155, 164, 175; 362/3, 4, 14, 18
See application file for complete search history.

(56) References Cited

U.S. PATENT DOCUMENTS

| 5,475,466 A | 12/1995 | Iwasaki et al. | |
| 2004/0114921 A1* | 6/2004 | Braun et al. | 396/661 |
| 2007/0187573 A1* | 8/2007 | Aoki et al. | 250/205 |
| 2007/0263999 A1* | 11/2007 | Keam | 396/155 |
| 2009/0052881 A1* | 2/2009 | Lin | 396/175 |
| 2010/0183289 A1* | 7/2010 | Homma | 396/164 |
| 2011/0211056 A1 | 9/2011 | Publicover et al. | |
| 2011/0242334 A1* | 10/2011 | Wilburn et al. | 348/207.1 |
| 2011/0261178 A1 | 10/2011 | Lo et al. | |
| 2012/0141104 A1* | 6/2012 | DeLuca | 396/158 |
| 2012/0189291 A1* | 7/2012 | von Malm et al. | 396/157 |
| 2012/0257102 A1* | 10/2012 | Nakagawara | 348/371 |

* cited by examiner

*Primary Examiner* — Rodney Fuller
(74) *Attorney, Agent, or Firm* — Robert C. Kowert; Meyertons, Hood, Kivlin, Kowert & Goetzel, P.C.

(57) ABSTRACT

Systems and methods for providing spatially dynamic illumination in camera systems. A spatially dynamic illumination source enables the illumination of only desired objects in the field of view of the camera, thereby reducing the amount of light required from the illumination source. The spatially dynamic illumination source may include an array of illumination elements and a control component. Each illumination element in the illumination array may include a light-emitting element combined with an optical element. A camera and the spatially dynamic illumination source may be combined in a camera and illumination system. The camera and illumination system may dynamically detect, track, and selectively illuminate only desired objects in the camera field of view.

19 Claims, 16 Drawing Sheets

(a) light-emitting elements on at low power or off (b) detected regions of motion, light-emitting elements turned on for those regions (c) updated illumination array to cover new object position

SPATIALLY DYNAMIC ILLUMINATION FOR CAMERA SYSTEMS

BACKGROUND

1. Technical Field

This disclosure relates generally to camera illumination systems, and more specifically to spatially dynamic illumination systems for camera systems.

2. Description of the Related Art

Active illumination cameras are often used to capture depth information of a scene and to provide an additional sensing dimension to a system. Active illumination camera systems, such as Time of Flight (ToF) or structured light systems, rely on illumination sources to illuminate objects in the field of view of the capturing camera. In order to cover the camera field of view, the illumination source must have a projected field of view at least as large as the field of view of the lens of the capturing camera system. The intensity of illumination on objects in watts per meter squared reduces the farther away the objects are from the camera. The intensity drops off proportional to the inverse square of the distance from the camera. Thus, when illuminating objects far away from the camera, the light source intensity must be higher than when illuminating objects close to the camera to achieve the same signal to noise ratio. This leads to higher power requirements for the illumination source of active illumination systems where objects are farther from the camera. For example, a system that is intended to illuminate objects 2 to 5 meters from the camera may require several watts of illumination power. This higher power requirement for illuminating objects at greater distances makes deployment of active illumination cameras in lower power devices impractical.

FIG. 1 is used to illustrate that the illumination area increases with distance from a camera. The Figure shows the horizontal field of view (HFOV) and the vertical field of view (VFOV) of a camera and illumination source 102 of a device 100. The object 106 distance from the camera and illumination source 102 is labeled as distance D, and the area illuminated by the illumination source is shown as area of illumination at D 104. The area of illumination at D 104 is at least as large as the field of view of the camera at D. The overall number of photons illuminating the object 106 decreases proportionally to the inverse square of the distance D. For example, if object 106 is located at D=one meter and the illumination power falling on the object 106 at D is 90 milliwatts (mW), then if object 106 is moved to D=three meters from the illumination source, the illumination power falling on the object is reduced to 10 mW. Thus, the farther the object 106 from the illumination source, the more illumination power is wasted illuminating areas of the field of view that may not contain meaningful object information. For example, if the desire is to track a person, providing illumination across the entire field of view when the person only fills 10% of the field of view means that 90% of the illumination energy of the illumination source is wasted.

SUMMARY OF EMBODIMENTS

Embodiments of the present disclosure may provide spatially dynamic illumination in camera systems. Embodiments may enable the illumination of only desired objects in the field of view of the camera, thereby reducing the amount of light required from the illumination source. In at least some embodiments, the spatially dynamic illumination source includes an array of illumination elements and a control component. In at least some embodiments, each illumination element in the illumination array includes a light-emitting element combined with an optical element. The camera and spatially dynamic illumination source may collectively be referred to as a camera and illumination system. The camera and illumination system may dynamically detect, track, and selectively illuminate only desired objects in the camera field of view. Significant reduction in power usage may thereby be realized in camera systems.

In at least some embodiments, the spatially dynamic illumination source combines a light-emitting element array with an optical element array. In at least some embodiments, each light-emitting element in the light-emitting element array corresponds to an optical element in the optical element array. The light-emitting elements may be lasers (e.g., vertical cavity surface emitting laser (VCSEL) technology lasers), light-emitting diodes (LEDs), or similar light sources. In some embodiments, the light-emitting elements may emit light in the visible portion of the spectrum. In some embodiments, the light-emitting elements may emit infrared light. Each optical element in the optical element array may include one or more lenses and/or prisms that act to control focus, shape, and/or direction of the light beam of a corresponding light emitting element. The light-emitting element array and optical element array may collectively be referred to as an illumination array. A light-emitting element and its corresponding optical element may collectively be referred to as an illumination element. In various embodiments, the illumination array may be a one-dimensional or a two-dimensional array of illumination elements that may illuminate a portion of or the entire camera field of view by subdividing the field of view into one-dimensional strips or a two-dimensional grid, respectively. Each illumination element in the illumination array may cover a particular region of the field of view of the camera. In at least some embodiments, the regions covered by adjacent illumination elements may slightly overlap to ensure continuous illumination coverage across the camera field of view.

The control component may obtain images captured by the camera, and the camera and illumination system may analyze the images, detect regions of motion in the images, map the regions of motion to the illumination array, and, via the control component, selectively activate, deactivate, move, and/or control the output of the individual illumination elements in the illumination array to selectively illuminate one or more regions of the field of view of the camera in which a detected object that is being tracked is currently located. In some embodiments, the camera and illumination system may also estimate depth of a detected object (i.e., how far the object is from the camera), and may adjust the light output of the individual illumination elements according to the depth.

Figure 1:
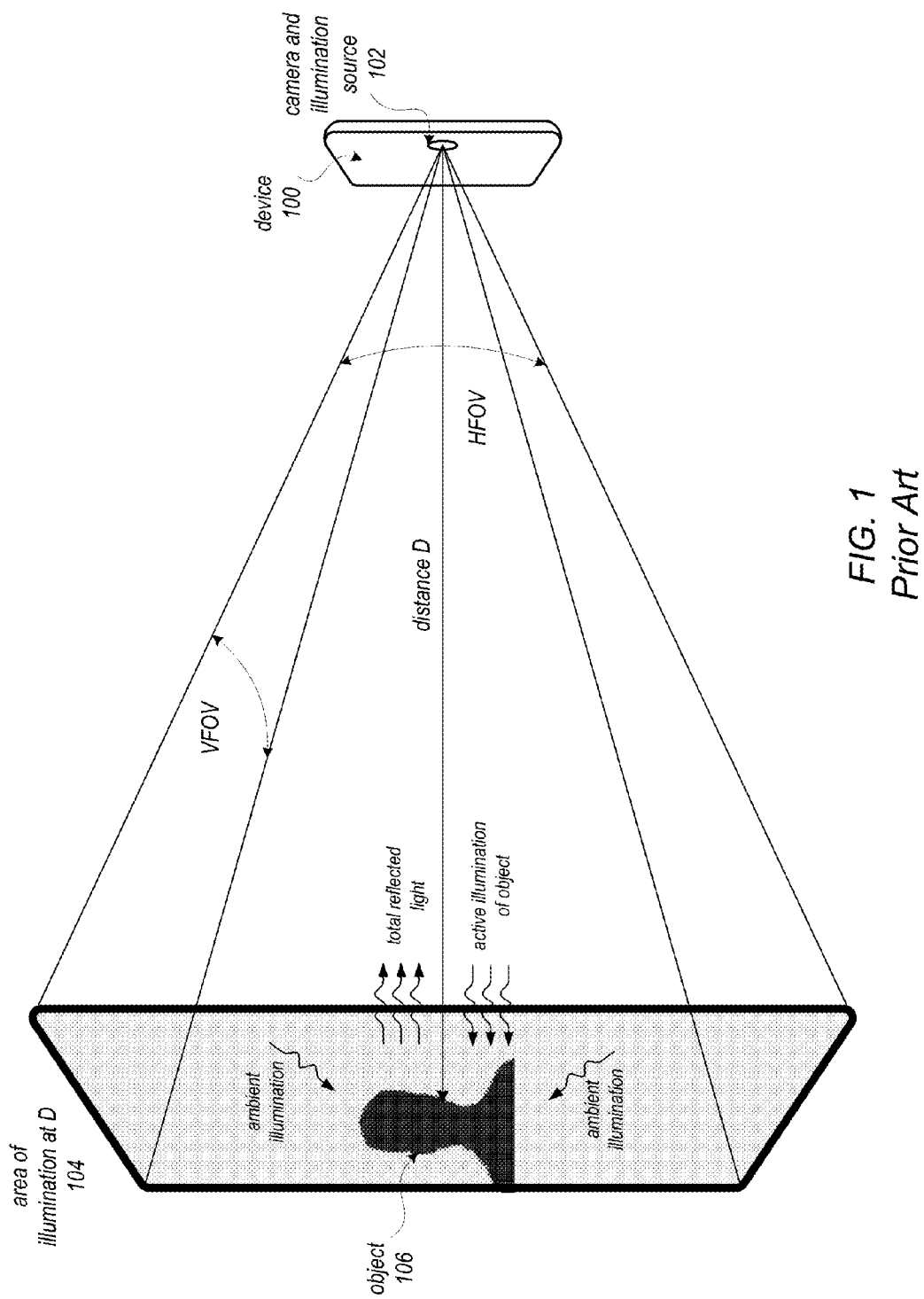
FIG. 1 illustrates that the illumination area increases with distance from a camera.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware— for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Various embodiments of systems and methods for providing spatially dynamic illumination in camera systems are described. Embodiments of a spatially dynamic illumination source are described that enable the illumination of only desired objects in the field of view of the camera, thereby reducing the amount of light required from the illumination source. In at least some embodiments, the spatially dynamic illumination source includes an array of illumination elements and a control component. In at least some embodiments, each illumination element in the illumination array includes a light-emitting element combined with an optical element. The camera and spatially dynamic illumination source may collectively be referred to as a camera and illumination system. The camera and illumination system may dynamically detect, track, and selectively illuminate only desired objects in the camera field of view. Significant reduction in power usage may thereby be realized in camera systems. The power reduction provided by embodiments of the spatially dynamic illumination source may, for example, make active illumination camera systems more practical for use in lower power devices.

Embodiments of the spatially dynamic illumination source may be implemented as an illumination source in stand-alone camera systems including but not limited to video cameras and still cameras. In addition, embodiments of a camera and illumination system that include an embodiment of the spatially dynamic illumination source integrated with a camera may be implemented in various devices including but not limited to personal computer systems, desktop computer systems, laptop and notebook computers, tablet or pad devices, mobile phones and smart phones, video game consoles, handheld video game devices, and televisions. Applications of the camera and illumination system may include but are not limited to video recording applications, still image capture applications, motion detection and tracking applications, and active illumination camera systems such as Time of Flight (ToF) or other range imaging camera systems, or structured light or other 3D scanning systems.

Spatially Dynamic Illumination Source

In at least some embodiments, the spatially dynamic illumination source combines a light-emitting element array with an optical element array and a control component. Each light-emitting element in the light-emitting element array corresponds to an optical element in the optical element array. The light-emitting elements may be lasers (e.g., vertical cavity surface emitting laser (VCSEL) technology lasers), light-emitting diodes (LEDs), or similar light sources. In some embodiments, the light-emitting elements may emit light in the visible portion of the spectrum. In some embodiments, the light-emitting elements may emit infrared light. In some embodiments, different light-emitting elements in the array may emit light of different wavelengths or in different optical spectra. Each optical element in the optical element array may include one or more lenses and/or prisms that act to control focus, shape, and/or direction of the light beam of a corresponding light emitting element. In some embodiments, each optical element may include one or more lenses and one or more prisms, and thus the optical element array may include a lens array and a prism array. In some embodiments, rather than having separate lens and prism elements in each optical element, each optical element in the optical element array may combine the optical characteristics of a lens and a prism. In some embodiment, the optical element array may include only lenses.

Note that a lens may be a single optical element or may be a lens system that includes two or more optical elements that together act as a single lens system. Thus, "lens" as used herein may refer to either a single optical element or a lens system that includes two or more optical elements.

The light-emitting element array and optical element array may collectively be referred to as an illumination array. A light-emitting element and its corresponding optical element may collectively be referred to as an illumination element. In various embodiments, the illumination array may be a one-dimensional or a two-dimensional array of illumination elements that may illuminate a portion of or the entire camera field of view by subdividing the field of view into one-dimensional strips or a two-dimensional grid, respectively. Each illumination element in the illumination array may cover a particular region of the field of view of the camera.

In at least some embodiments, the regions of the field of view covered by adjacent illumination elements may slightly overlap to ensure continuous illumination coverage across the camera field of view. In some embodiments, the regions covered by adjacent illumination elements may more substantially overlap. In these embodiments, the illumination elements may be arranged so that the light beams have significant or substantial overlap with neighboring light beams. In addition to ensuring continuous illumination coverage across the camera field of view, overlapping the coverage of the light beams may have other uses. For example, in some embodiments, the overlapping regions illuminated by neighboring illumination elements may be used in determining depth by analyzing the interference pattern in the image caused by two overlapping light (e.g., laser) beams. In these embodiments, there may be substantial overlap between neighboring beams, and each beam may have multiple neighbors.

The control component may obtain images captured by the camera, and the camera and illumination system may analyze the images, detect regions of motion in the images, map the regions of motion to the illumination array, and, via the control component, selectively activate, deactivate, move, and/or control the output of the individual illumination elements in the illumination array to selectively illuminate one or more regions of the field of view of the camera in which a detected object that is being tracked is currently located. In some embodiments, the camera and illumination system may also estimate depth of a detected object (i.e., how far the object is from the camera), and may adjust the light output of the individual illumination elements according to the depth.

Figure 2:
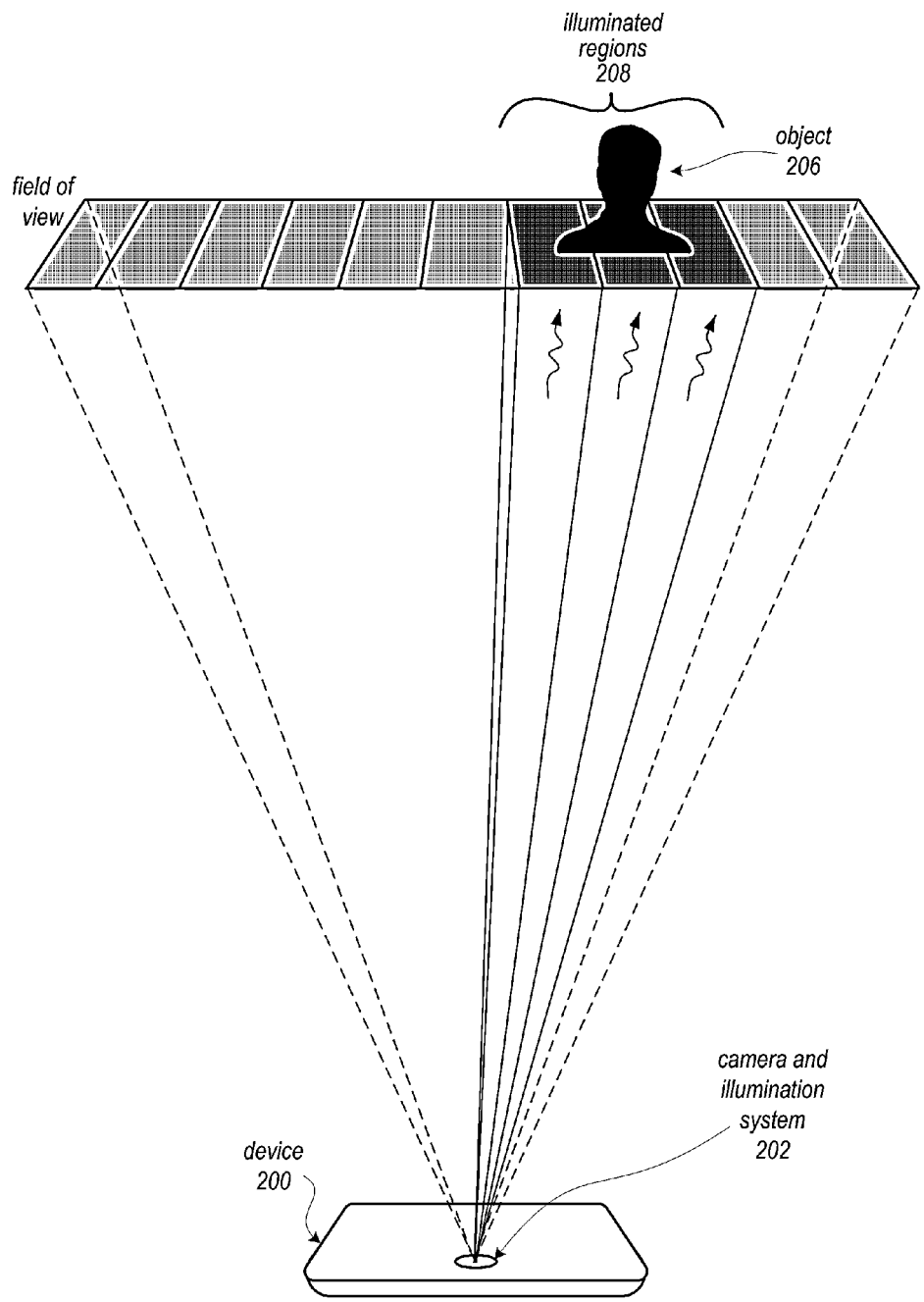
FIG. 2 shows an example of subdividing illumination into vertical strips using a one-dimensional illumination array, according to at least some embodiments.

FIG. 2 shows an example of subdividing illumination into vertical strips using a one-dimensional illumination array, according to at least some embodiments. A device 200 may include a camera and illumination system 202. Camera and illumination system 202 may include a camera, a one-dimensional illumination array of illumination elements, and a control component coupled to the camera and to the illumination array. Each illumination element in the illumination array may be individually controlled by the control component to enable selective illumination of a detected object 206 in the field of view. As shown by illuminated regions 208, only the three regions of the camera's field of view that include the object 206 are illuminated by corresponding illumination elements in the array that are currently activated by the control component in response to detecting and tracking the object 206. The illumination elements in the array that correspond to the other regions of the field of view are either deactivated or placed at a low power setting by the control component.

Figure 3A:
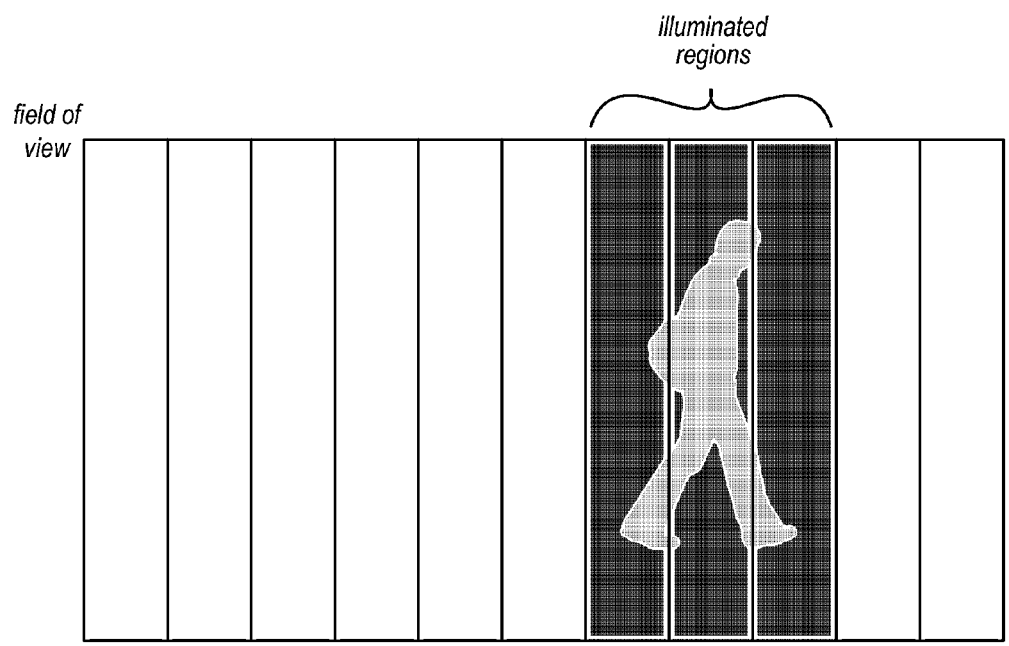
FIGS. 3A and 3B illustrate selective scene illumination using a one-dimensional illumination array, according to at least some embodiments.
Figure 3B:
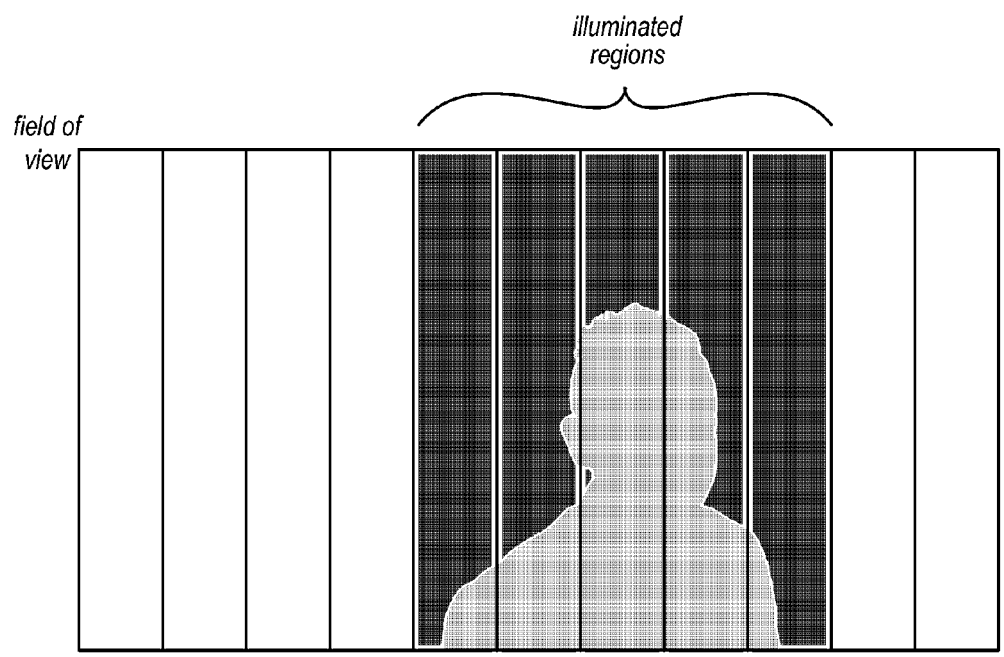

FIGS. 3A and 3B further illustrate selective scene illumination using a one-dimensional illumination array, according to at least some embodiments. In FIGS. 3A and 3B, each vertical rectangle, or slice, in the field of view corresponds to a region of the field of view that is illuminated by a corresponding illumination element in the illumination array. As shown in FIG. 3A, tracking an object such as a person that is farther away from the camera requires fewer illumination slices. As an object being tracked (in this example, a person) gets closer, additional illumination elements may be activated to illuminate additional slices of the field of view, as shown in FIG. 3B. However, in at least some embodiment, each slice's overall optical power may be reduced when the object moves closer, since signal increases at closer distances. In other words, the output (and thus power consumption) of the individual illumination elements corresponding to the illuminated regions in FIG. 3B may be less than the output of the individual illumination elements corresponding to the illuminated regions in FIG. 3A, since the object is closer to the camera and illumination source in FIG. 3B than in FIG. 3A.

Figure 4:
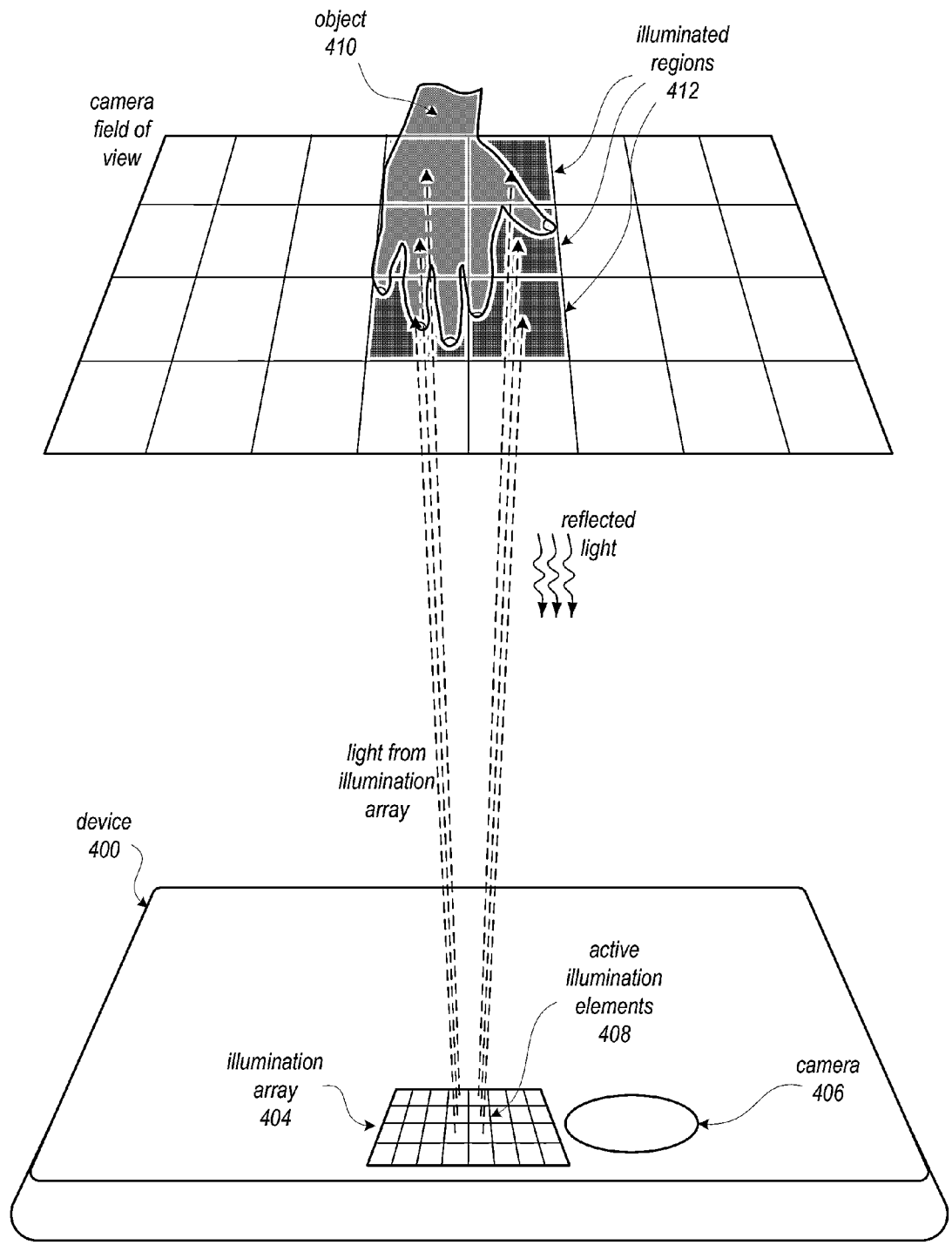
FIG. 4 shows an example of subdividing illumination into a two-dimensional grid using a two-dimensional illumination array, according to at least some embodiments.

FIG. 4 shows an example of subdividing illumination into a two-dimensional grid using a two-dimensional illumination array, according to at least some embodiments. A device 400 may include a camera and illumination system that includes a camera 406, an illumination array 404, and a control component coupled to the camera and to the illumination array. Each illumination element in the illumination array 404 may be individually controlled by the control component to enable selective illumination of a detected object 410 in the field of view, in this example a human hand. As shown in FIG. 4 by illuminated regions 412, only the six regions of the camera's field of view that include the object 410 are illuminated by corresponding illumination elements 408 in the array that are currently activated by the control component in response to detecting and tracking the object 410. The illumination elements in the array that correspond to the other regions of the field of view are either deactivated or placed at a low power setting by the control component.

Figure 5A:
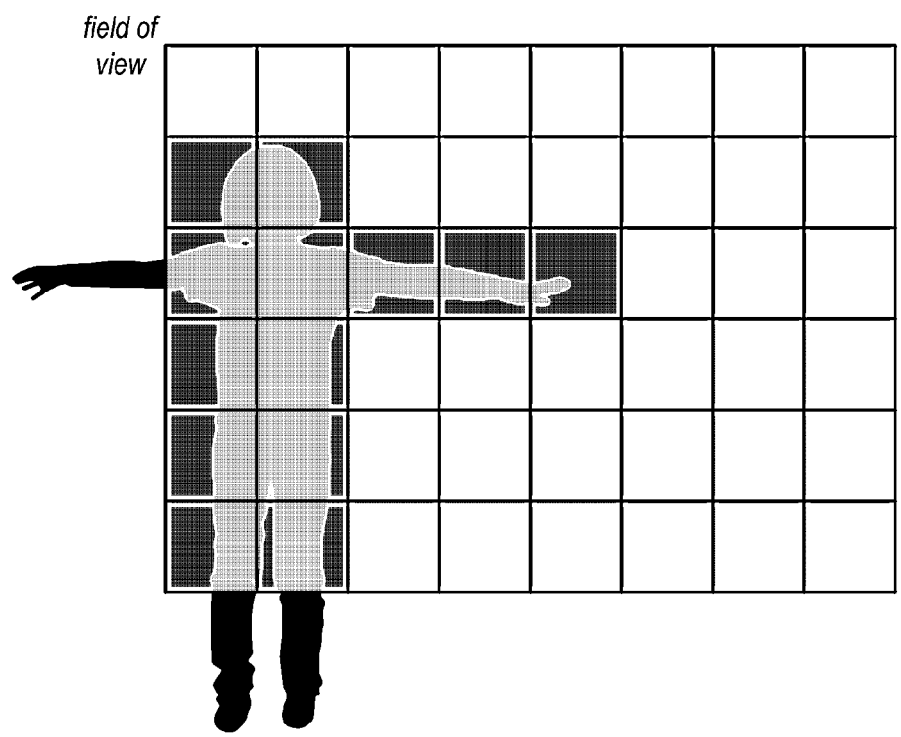
FIGS. 5A and 5B further illustrate selective scene illumination using a two-dimensional illumination array, according to at least some embodiments.
Figure 5B:
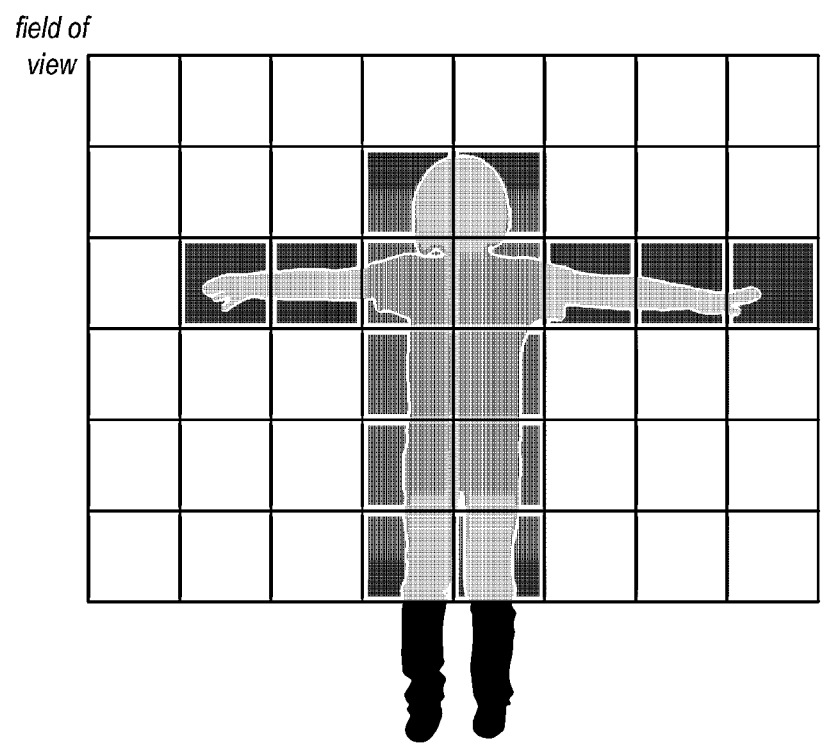

FIGS. 5A and 5B further illustrate selective scene illumination using a two-dimensional illumination array, according to at least some embodiments. In FIGS. 5A and 5B, each rectangle in the field of view corresponds to a region of the field of view that is illuminated by a corresponding illumination element in the 2D illumination array. As shown in FIG. 5A, an object such as a person that enters the field of view of the camera may be detected by the control component, and a portion of the illumination elements in the 2D illumination array may be activated to illuminate region(s) of the field of view in which the object is currently located. As the object being tracked (in this example, a person) moves relative to the camera, the motion is detected by the control component and some illumination elements are deactivated while others are activated to illuminate region(s) of the field of view into which the object has moved, as shown in FIG. 5B.

While FIGS. 2 through 5B show relatively even and substantially square or rectangular regions illuminated by the illumination elements in the illumination array, in at least some embodiments, the regions covered by adjacent illumination elements may slightly overlap to ensure continuous illumination coverage across the camera field of view. Also note that the shape of the light beam of a given illumination element at the field of view may be substantially rectangular or square, circular or elliptical, or of other regular or irregular geometric shapes. However, in at least some embodiments, when analyzing images captured by the camera to detect objects in the field of view and controlling the illumination elements in the illumination array according to the detected objects, the control component of the camera and illumination system may analyze the image data and control the illumination array according to a rectangular or square grid pattern as shown in FIGS. 3A-3B and 5A-5B.

Further note that the shape of the light beam of a given illumination element as measured by looking at the intensity of the beam in a cross-section perpendicular to the direction of the beam may, but does not necessarily, change along the path of the beam as is consistent with the physical laws of diffraction and interference of light. In addition, the light beam of a given illumination element in any given cross section may appear as a single solid field of light, or alternatively may be composed of a collection of sub-fields of light such as a collection of circles or dots or other general regular or irregular shapes. Furthermore, in some embodiments, different ones of the illumination elements in the array may emit light beams of different shapes.

Example Illumination Array Designs

Figure 6:
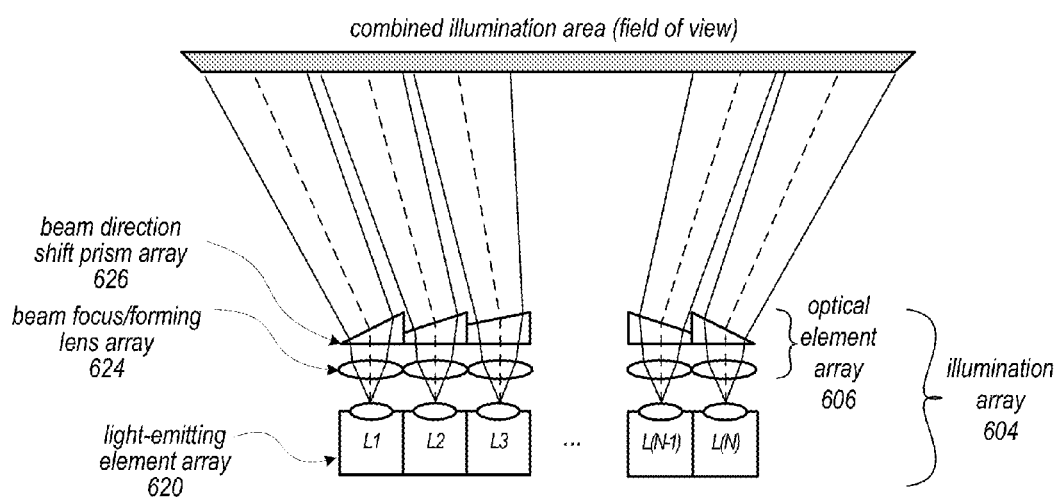
FIG. 6 illustrates an example illumination array, according to at least some embodiments.

FIG. 6 illustrates an example illumination array, according to at least some embodiments. Illumination array 604 represents either a one-dimensional illumination array as illustrated in FIGS. 2 and 3A-3B or one row or column of a two-dimensional illumination array as illustrated in FIGS. 3 and 4A-4B. In at least some embodiments, illumination array 604 may include a light-emitting element array 620 and an optical element array 606. A one-dimensional illumination array includes light-emitting elements L1→L(N). A two-dimensional illumination array would include at least two rows of N light-emitting elements (see FIG. 7). The light-emitting elements may be lasers (e.g., vertical cavity surface emitting laser (VCSEL) technology lasers), light-emitting diodes (LEDs), or similar light sources. In some embodiments, the light-emitting elements may emit light in the visible portion of the spectrum. In some embodiments, the light-emitting elements may emit infrared light. In some embodiments, different light-emitting elements in the array may emit light of different wavelengths or in different optical spectra.

In some embodiments, the optical element array 606 may include a beam focus/forming lens array 624 and a beam direction shift prism array 626. Each optical element in the optical element array 606 corresponds to one light-emitting element in array 620, and each optical element may include one lens element in lens array 624 and one prism element in prism array 626. Each lens element in the beam forming/focusing lens array 624 transforms the corresponding light-emitting element (e.g., laser) output beam shape and divergence angle to a desired beam shape and divergence angle to cover a respective region in the field of view of camera system. Each prism in the prism array 626 has a slightly different exit plane angle to shift the direction of a corresponding light-emitting element's output beam to cover a respective region of the field of view of the scene and the capturing camera. Thus, the beam focus/forming lens array 624 and beam direction shift prism array 626 may act together to shape and shift the output of the light-emitting element array to cover the field of view of the camera.

Figure 7:
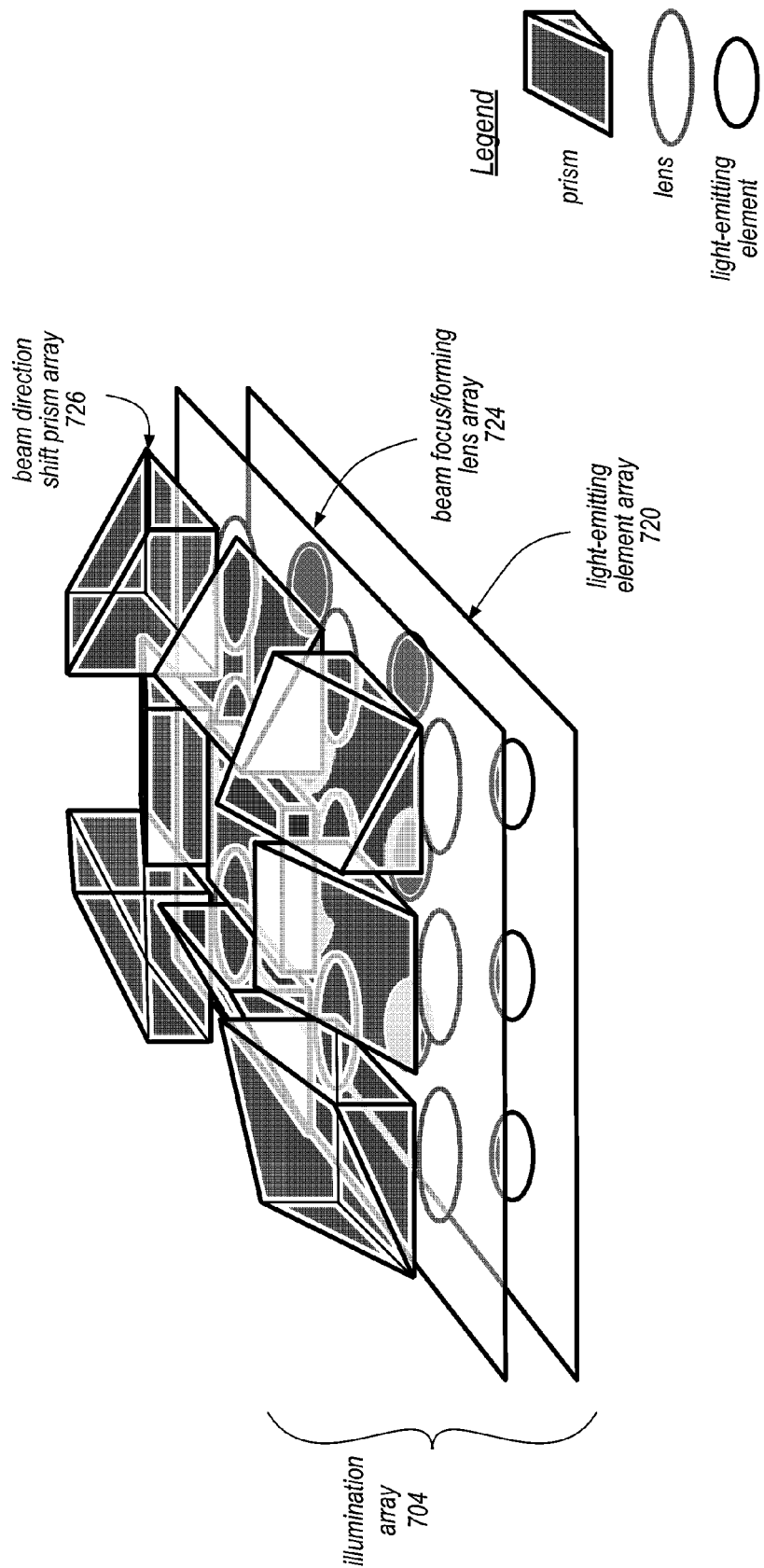
FIG. 7 shows an expanded 3D view of an example 3×3 two-dimensional illumination array, according to at least some embodiments.

FIG. 7 shows an expanded 3D view of an example 3×3 two-dimensional illumination array, according to at least some embodiments. Illumination array 704 may include light-emitting element (e.g., VCSEL) array 720, beam focus/forming lens array 724, and beam direction shift prism array 726. Each lens element in the beam forming/focusing lens array 724 transforms the corresponding light-emitting element (e.g., laser) output beam shape and divergence angle to a desired beam shape and divergence angle to cover a respective region in the field of view of camera system. Each prism in the prism array 726 has a slightly different exit plane angle to shift the direction of a corresponding light-emitting element's output beam to cover a respective region of the field of view of the scene and the capturing camera. Thus, the beam focus/forming lens array 724 and beam direction shift prism array 726 may act together to shape and shift the output of the light-emitting element array to cover the field of view of the camera.

As noted above in reference to FIGS. 6 and 7, a purpose of each prism element in the prism array is to deflect (change) the direction of the light beam emitted by a corresponding light-emitting element in the light-emitting element array. In at least some embodiments, this deflection may be achieved by using appropriately shaped "wedge" prism elements as shown in FIGS. 6 and 7. However, in some embodiments, deflection of the light beams may be achieved through other optical mechanisms or technologies. For example, in some embodiments, the deflection may be performed using refractive properties of a plane-parallel plate of glass or other optical material such as plastic or crystal instead of a wedge prism element as shown in FIGS. 6 and 7. In these embodiments, the optical material of which the plate is composed may have a variable refractive index across the extent of the plate so that the respective light beam is deflected as it passes through the plane-parallel plate. As another example, in some embodiments, instead of a wedge prism element as shown in FIGS. 6 and 7 to deflect or change the path of the light beams, fiber-optics technology may be used to direct the paths of the light beams.

In some embodiments, rather than having separate lens and prism arrays and separate lens and prism elements in each optical element as shown in FIGS. 6 and 7, each optical element in the optical element array may be a single optical element that combines the optical characteristics of a lens and a prism. In some embodiments, the optical element array may include only lenses, or only prisms.

Referring to FIGS. 6 and 7, each light-emitting element in the light-emitting element array emits illumination that may be characterized as a "beam" of light. The properties of each beam may be modified by a corresponding element in the beam focus/forming lens array. In general, each light source (beam) has a corresponding lens that shapes the beam to fill a desired portion of the camera's field of view. In some embodiments, substantially identical lenses may be used with each light-emitting element. In some embodiments, the lens may differ for at least two different light-emitting elements.

In at least some embodiments, to avoid problems with parallax, the light-emitting elements may be positioned very close together in the light-emitting element array. In at least some embodiments, there may be less than 1 mm (one millimeter) between each light-emitting element in the light-emitting element array.

The optical elements in the optical element array may be characterized by the beam angle(s) that define the shape of the illumination produced by each light-emitting element. The optical element array acts to set the shape and direction of the illumination of each light-emitting element to cover the field of view of the camera. In at least some embodiments, each optical element in the optical element array may include one or more prisms and a lens or lens system. The lens or lens system may act to alter the width, size, or divergence angles of the light beam of the respective light-emitting element to cover a respective region of the field of view of the camera. The prism(s) may act to set the overall direction of the light beam of the respective light-emitting element. In some embodiments, the prism(s) (or a combination of the prism(s) and the lens) may act to stretch the beam shape differently in one direction than another. For example, in the case of a one-dimensional illumination array as illustrated in FIGS. 2 and 3A-3B, the prism(s) (or a combination of the prism(s) and the lens) may act to elongate the beam to cover a strip of the field of view. As another example, in the case of a two-dimensional illumination array as illustrated in FIGS. 3 and 4A-4B, the prism(s) (or a combination of the prism(s) and the lens) may act to change the beam shape for light-emitting elements that emit non-rotationally-symmetric light beams. As another example, in the case of a two-dimensional illumination array as illustrated in FIGS. 3 and 4A-4B, the prism(s) (or a combination of the prism(s) and the lens) may act to change the beam shape to illuminate elliptical or rectangular regions rather than circular or square regions.

In some embodiments that use lasers as the light-emitting elements, the emitted light may be tailored to have a beam profile of a Gaussian beam. Many lasers either emit Gaussian beams by default, or can be made to emit Gaussian beams by modifying the geometry of the resonator cavity or by controlled optical feedback into the cavity. In these embodiments, the optical element array may be designed to match the field of view of the camera according to the following parameters:

laser wavelength;

distance between the laser's beam waist and the lens system; and the divergence angle of the laser's fundamental Gaussian beam.

Figure 8:
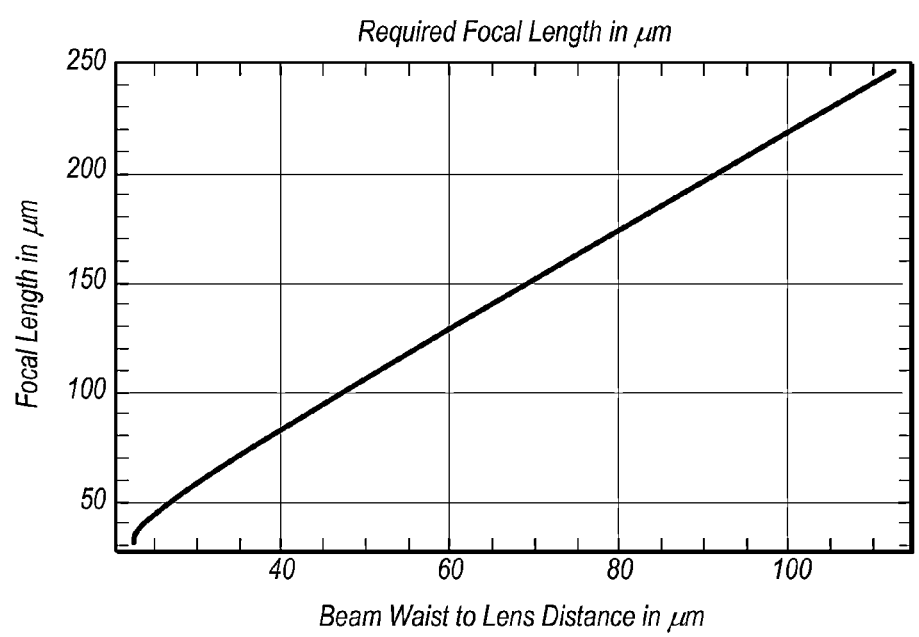
FIG. 8 is a graph that illustrates the relationship between the distance from the laser to the lens and the focal length of the lens.

In these embodiments, the lenses used to shape the Gaussian beam may be characterized by focal length, size, and distance between the laser and the lens. For example, given a field of view of the camera of 70°, an 8×8 array of lasers that serve as the light-emitting elements, and a beam divergence angle of 16° for each laser, the lens for each laser should adjust the beam divergence angle to 70°/8=8.75°. The relationship between the distance from the laser to the lens and the focal length of the lens is illustrated in FIG. 8.

Variations on Illumination System Designs

Figure 9:
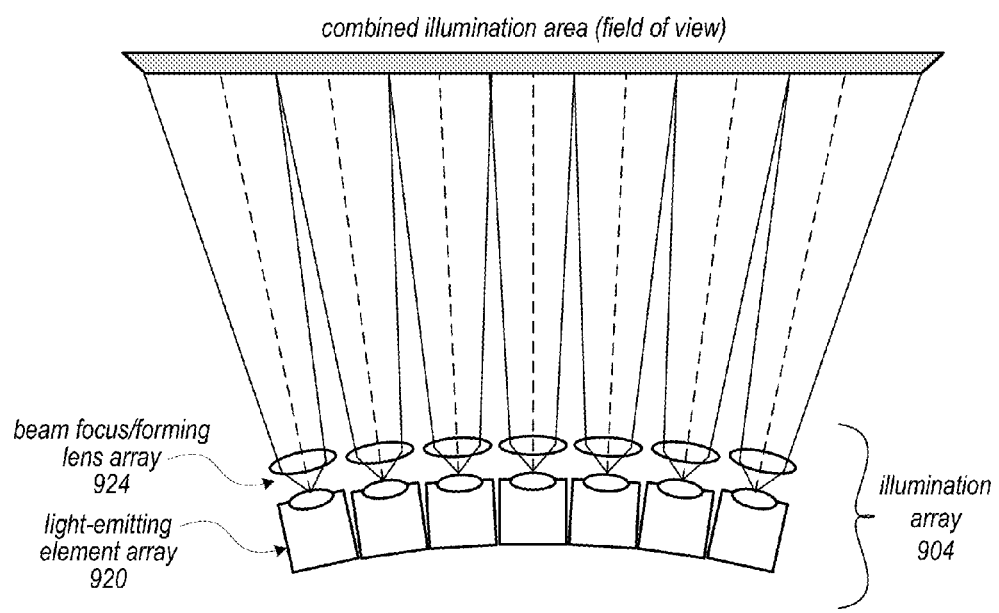
FIG. 9 shows an example illumination array that includes illumination elements arranged in a curve or sphere, according to some embodiments.

FIGS. 6 and 7 show examples of designs for an illumination array that may be used in at least some embodiments. However, variations of these designs, or other designs, may be used to implement the illumination array. For example, in some embodiments, LEDs may be used instead of lasers. As another example, in some embodiments, instead of separate lens and prism elements, each optical element may be a single element that combines the optical characteristics of a lens and a prism. As another example, in some embodiments, instead of being implemented as separate array(s) as shown in FIGS. 6, 7, and 9, the optical elements may be integrated with or components of the light-emitting elements. As another example, in some embodiments, the light-emitting elements may be infrared technology elements (e.g., infrared lasers) and thus may emit light in the infrared portion of the spectrum, while in other embodiments the light-emitting elements may emit light in the visible portion of the spectrum (visible light). In some embodiments, different light-emitting elements in the array may emit light of different wavelengths or in different optical spectra. Note that in embodiments that implement infrared technology elements, the photosensor of the camera is selected to be capable of capturing image information in the infrared.

As another example, in some embodiments, the illumination array may be implemented as an array of illumination elements mounted on a curved or convex surface or otherwise arranged in a curved or convex fashion to avoid needing beam-shifting prisms. In these embodiments, each illumination element in the illumination array may include only a light-emitting element and a lens or lens system. FIG. 9 shows an example illumination array that includes illumination elements arranged in a curve or sphere, according to some embodiments. As in FIG. 6, illumination array 904 represents either a one-dimensional illumination array or one row or column of a two-dimensional illumination array. Curvature may be in three dimensions for a two-dimensional array to thus form a convex shape. Illumination array 904 includes a light-emitting element array 920 and a beam focus/forming lens array 924. Each illumination element in the illumination array includes a light-emitting element and a lens. Instead of including beam-shifting prisms in the optical elements, the curvature of the illumination array acts to direct the beams emitted by the light-emitting elements to cover respective regions of the field of view.

Figure 10:
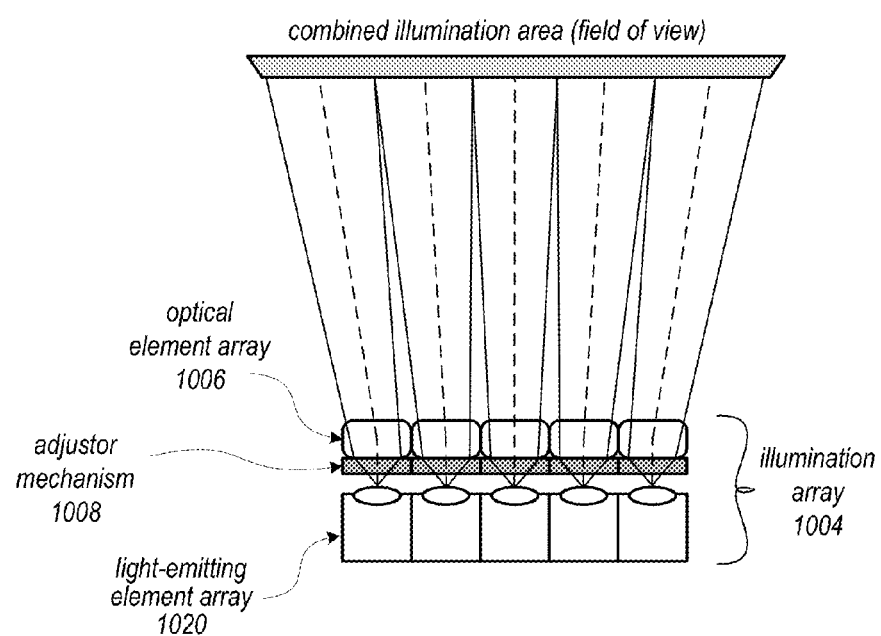
FIG. 10 shows an example illumination array that includes an adjustor mechanism coupled to the optical element array, according to some embodiments.

As another example, in some embodiments, the illumination array may include technology implemented as an adjustor mechanism for the optical element array to adjust the positioning of the optical elements in the optical element array under control of the control component. FIG. 10 shows an example illumination array that includes an adjustor mechanism 1008 coupled to the optical element array 1006, according to some embodiments. As in FIG. 6, illumination array 1004 represents either a one-dimensional illumination array or one row or column of a two-dimensional illumination array, and includes a light-emitting element array, an optical element array 1006, and an adjustor mechanism 1008. For example, in some embodiments, the adjustor mechanism 1008 may include MEMS (microelectromechanical system) technology, voice coil actuator or voice coil motor technology, or other appropriate technology that may be coupled to the lenses and/or to the prisms in the optical element array 1006 and may be controlled by the control component to adjust positioning of the optical elements in the optical element array 1006. The adjustor mechanism 1008 may, for example, move one or more of the optical elements up and down, tilt one or more of the optical elements, horizontally or vertically shift one or more of the optical elements, or a combination thereof to adjust the size, shape, and/or direction of the light beams emitted by the light-emitting elements in light-emitting element array 1020. The adjustor mechanism 1008 may, for example, move one or more of the optical elements up, down, backwards, forwards or side to side, tilt one or more of the optical elements, horizontally or vertically shift one or more of the optical elements, or a combination thereof to adjust the size, shape, and/or direction of the light beams emitted by the light-emitting elements in light-emitting element array 1020. In some embodiments, adjustor mechanism 1008 may include using variable optics technology in the lenses such as liquid lenses (based on the electrowetting principle), liquid gradient index lenses (L-GRIN) or other variable optic technologies. In some embodiments, technology may be included to adjust the positioning and/or direction of the light-emitting elements under control of the control component instead of or in addition to the optical elements.

Figure 11A:
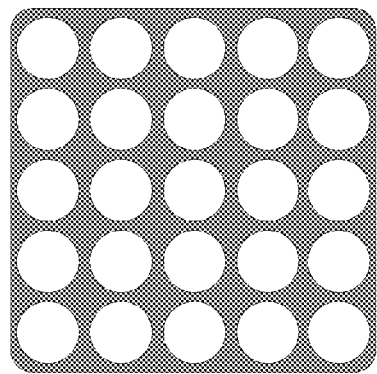
FIGS. 11A-11D show examples of arrangements and patterns of illumination elements in embodiments of a two-dimensional illumination array.
Figure 11B:
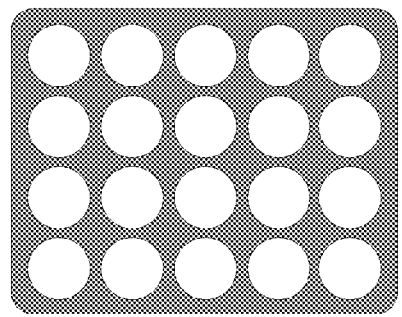
Figure 11C:
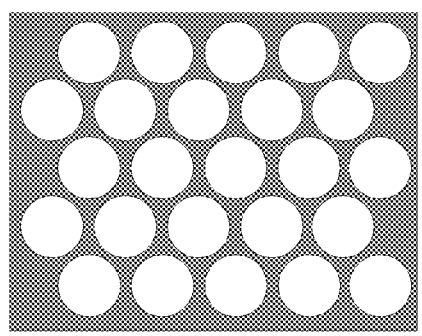
Figure 11D:
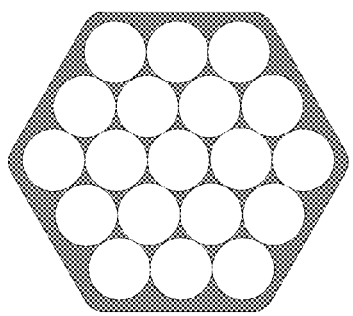

In embodiments that include a two-dimensional illumination array, various patterns and geometric shapes may be used for the illumination array. FIGS. 11A-11D show some examples, and are not intended to be limiting. In FIGS. 11A-11D, the white circles represent individual illumination elements in the illumination array. In FIG. 11A, the illumination array is substantially square, and includes an N×N grid of illumination elements. Note that the rows and columns of illumination elements are aligned. FIG. 11B shows a rectangular array with an M×N grid of illumination elements; the rows and columns of illumination elements are aligned. In this example, there are four rows and five columns of illumination elements. FIG. 11C shows a rectangular array with the rows offset and moved closer together. This offset pattern may allow more illumination elements to be fitted in a given space. FIG. 11D shows a substantially hexagonal array with a similar offset pattern as shown in FIG. 11C, and with the illumination elements moved close together.

In some embodiments, the illumination array may be arranged in other geometric shapes than those shown, for example substantially circular or elliptical shapes. In addition, other regular or irregular patterns of illumination elements may be used in the illumination array. Note that there may be more or fewer illumination elements in any of FIGS. 11A-11D. Also note that the spacing between the elements is not intended to be limiting; the illumination elements may be closer together than shown, or may be farther apart. In addition, in some embodiments, spacing between the illumination elements may not be uniform. For example, in some embodiments, illumination elements near the center of the pattern may be closer together than illumination elements towards the outside of the pattern. In some embodiments, the spacing between the illumination elements may be selected so that each possible pairing of elements is separated by either a unique distance or a unique distance and direction, for example as in a uniformly non-redundant array. This arrangement of the illumination elements may, for example, assist in analyzing the interference patterns caused by overlapping neighboring laser beams to determine depth information as previously mentioned.

Camera and Illumination System

Embodiments of the illumination array described above in reference to FIGS. 2 through 11 may be controlled by a control component. The illumination array and control component may be referred to as a spatially dynamic illumination source. The control component may also be coupled to a camera. The camera and spatially dynamic illumination source may collectively be referred to as a camera and illumination system. The camera and illumination system may dynamically detect, track, and selectively illuminate only desired objects in the camera field of view.

Figure 12:
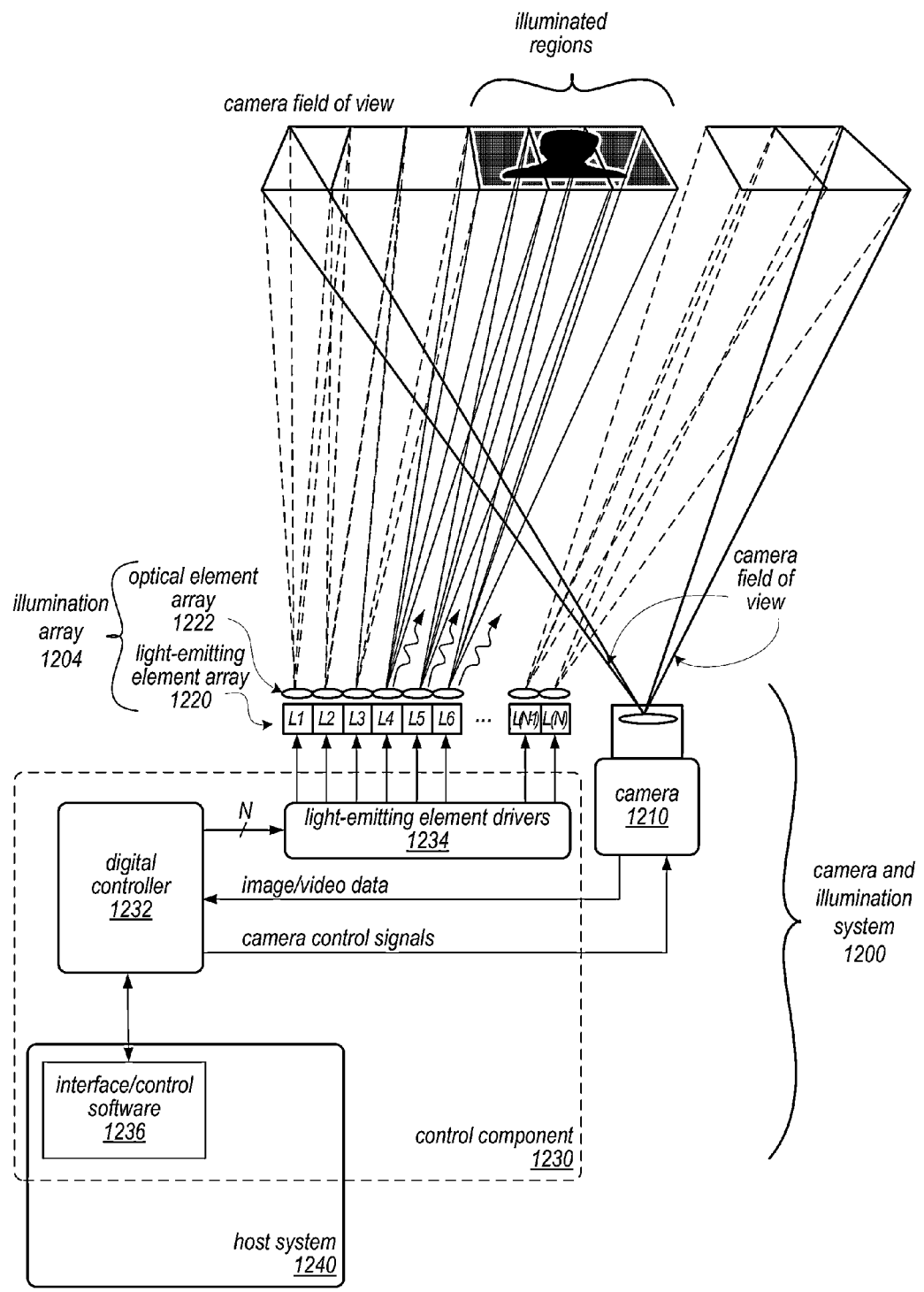
FIG. 12 is a block diagram of a camera and illumination system, according to at least some embodiments.

FIG. 12 is a block diagram of a camera and illumination system, according to at least some embodiments. Camera and illumination system 1200 may include, but is not limited to a camera 1210, an illumination array 1204, and a control component 1230. Camera and illumination system 1200 may be coupled to or integrated with a host system 1240. Host system 1240 may be any of various computing devices including but not limited to a personal computer, desktop computer, laptop or notebook computer, tablet or pad device, mobile phone, smart phone, or video game device. Alternatively, host system 1240 may be a stand-alone still or video camera system.

Camera 1210 may be a still camera, a video camera, or a camera capable of both still image and video capture. In general, camera 1210 includes at least a lens system and a photosensor such as a charge-coupled device (CCD) technology or complementary metal-oxide-semiconductor (CMOS) technology sensor. In applications that use infrared light-emitting elements, a photosensor may be used that can capture infrared light. Alternatively, in some applications, a photosensor may be used that can instead or also capture visible light. In some applications, camera 1210 may be coupled to or integrated with a computing device. For example, camera 1210 may be a small camera suitable for use in small devices such as mobile phones, smart phones, pad or tablet devices, and laptop or notebook computers. Alternatively, host system 1240 may be a stand-alone still or video camera system, in which case camera 1210 represents the imaging portion of the camera system.

Illumination array 1204 may be a one- or two-dimensional array of illumination elements as described in FIGS. 2 through 10. In some embodiments, the illumination elements may be integrated onto a chip or chips. Alternatively, the illumination elements may be discretely placed in an array layout on a circuit board, or may be otherwise implemented. Illumination array 1204 may include a light-emitting element array 1220 and an optical element array 1222, for example as illustrated in FIGS. 6 and 7. Each illumination element in illumination array 1204 includes a light-emitting element (e.g., a laser or LED). Each illumination element in illumination array 1204 may also include one or more lenses and/or one or more prisms, for example as illustrated in FIGS. 6 and 7. Each illumination element in illumination array 1204 acts to project light (e.g., infrared or visible light) emitted from the light-emitting element to cover a subdivided portion or region of the overall camera field of view, for example as shown in FIGS. 3A-3B, 5A-5B, and 12. In at least some embodiments, the regions covered by adjacent illumination elements may slightly overlap to ensure continuous illumination coverage across the camera field of view.

While not shown in FIG. 12, in some embodiments, the illumination array 1204 may also include an adjustor mechanism as shown in FIG. 10 that operates under control of control system 1230 to adjust the positioning of the illumination elements or components thereof.

The illumination array 1204 and camera 1210 may be controlled by control component 1230. In at least some embodiments, the control component 1230 may include a digital controller 1232, light-emitting element drivers 1234, and interface/control software 1236. Digital controller 1232 may be implemented as hardware, software, or as a combination thereof, and may be coupled to camera 1210 and to light-emitting element drivers 1234. In at least some embodiments, there is a separate light-emitting element driver for each light-emitting element in light-emitting element array 1220.

Each light-emitting element in light-emitting element array 1220 may be individually controlled by digital controller 1232 by sending digital signals to a corresponding light-emitting element driver 1234 to activate or deactivate the light-emitting element and/or to dynamically adjust intensity of the light emitted by the element. The digital controller 1232 sends signals to the light-emitting element drivers 1234 based on analysis of video or image data received from the camera 1210.

In at least some embodiments, host system 1240 may include interface/control software 1236 that may send and receive image, control, or other data to and from the digital controller 1232. In at least some embodiments, interface/ control software 1236 may include object detection and motion tracking software and other software to perform image processing tasks of the camera and illumination system on captured images as described herein. In at least some embodiments, interface/control software 1236 may include a user interface via which a user may, for example, view image or video data captured by the camera and illumination system and/or control operations of the camera and illumination system.

Example Methods of Operation of the Camera and Illumination System

Figure 13:
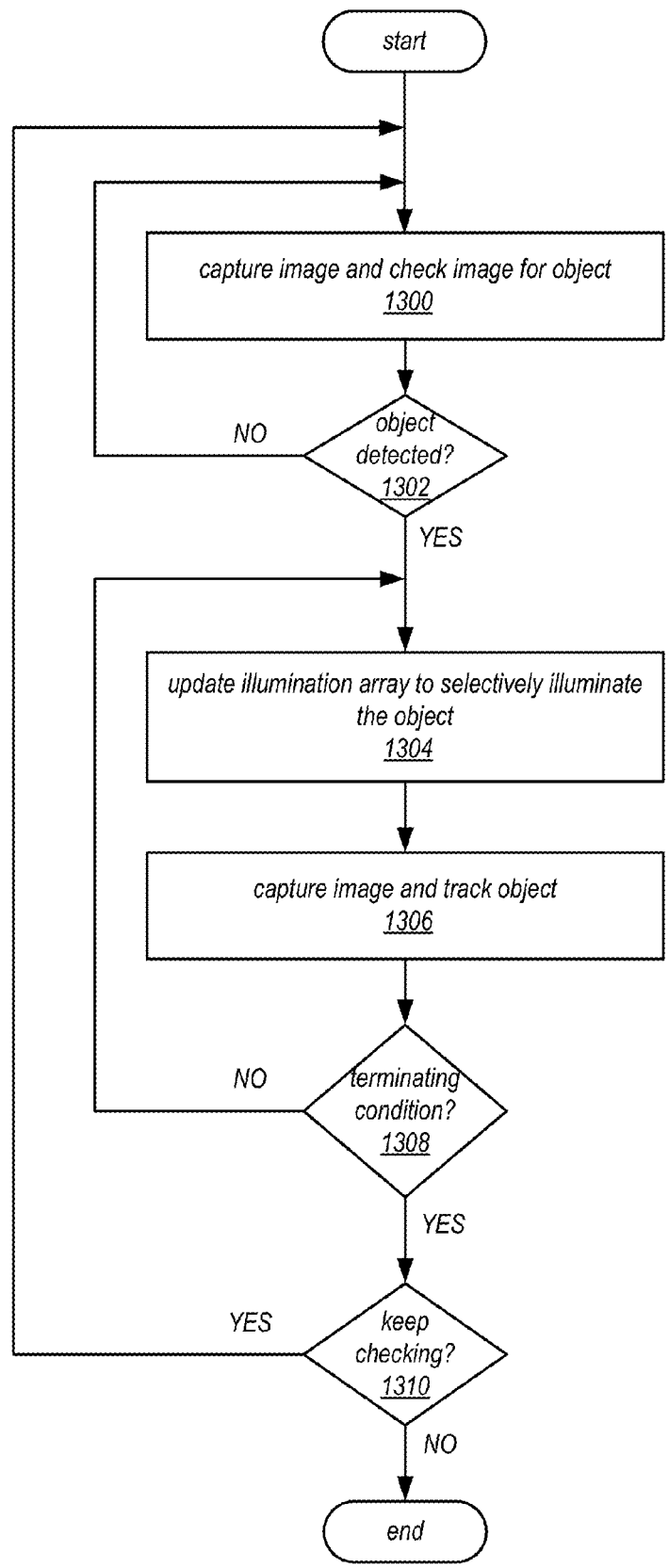
FIG. 13 is a high-level flowchart that illustrates a general method for object detection and tracking, according to at least some embodiments of the camera and illumination system.
Figure 14:
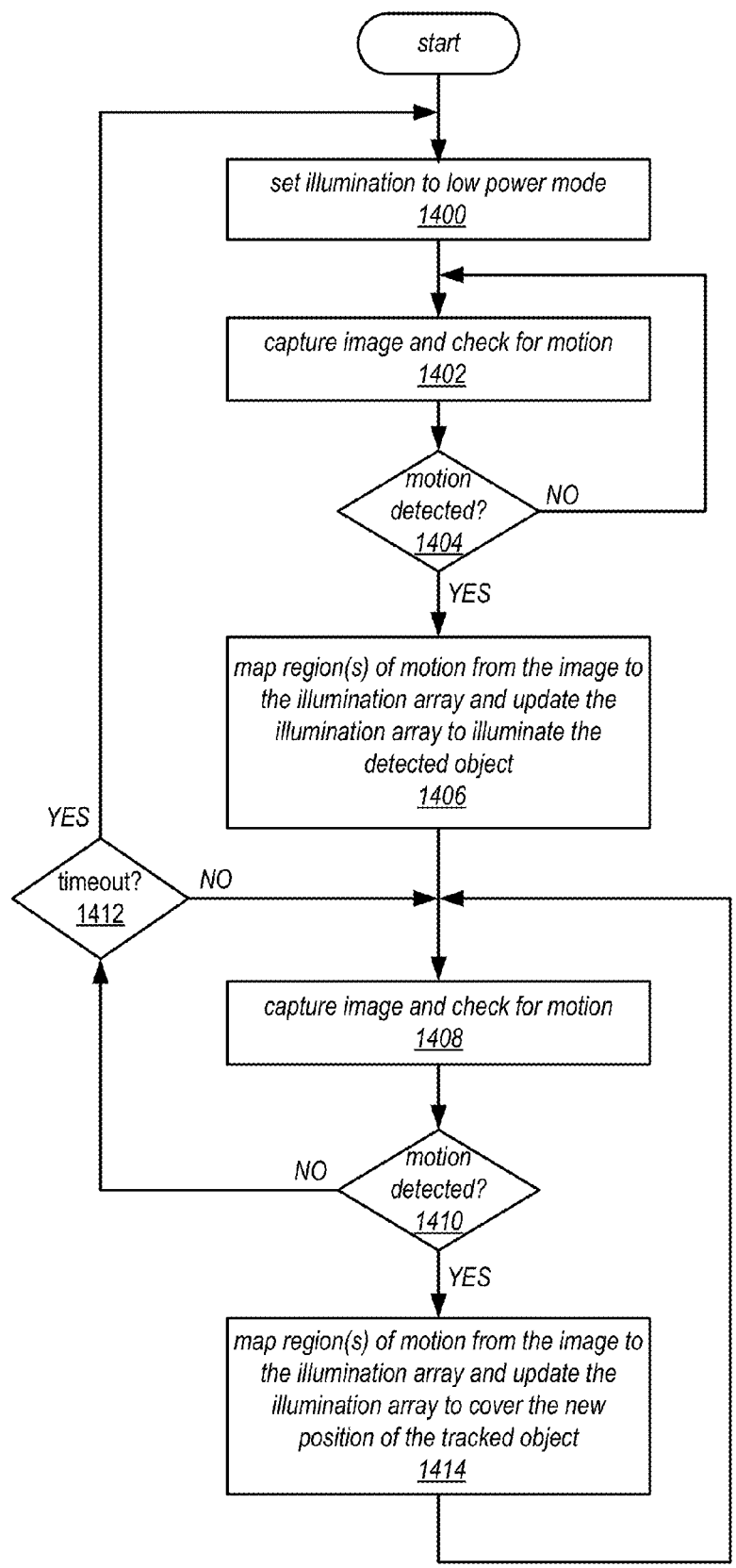
FIG. 14 is a flowchart that illustrates a method for object detection and tracking, according to at least some embodiments of the camera and illumination system.

FIGS. 13 and 14 are flowcharts that illustrate example methods of operation of embodiments of the camera and illumination system, for example as illustrated in FIG. 12. In particular, these flowcharts illustrate methods for object detection and tracking using embodiments of the camera and illumination system. FIG. 13 is a high-level flowchart that illustrates a general method for object detection and tracking, and FIG. 14 shows a method for object detection and tracking in more detail. These methods or variations thereof may, for example, be used in applications of the camera and illumination system as described herein including but not limited to video recording applications, still image capture applications, motion detection and tracking applications, and active illumination camera systems such as Time of Flight (ToF) or other range imaging camera systems, or structured light or other 3D scanning systems.

FIG. 13 is a high-level flowchart that illustrates a general method for object detection and tracking, according to at least some embodiments of the camera and illumination system. In at least some embodiments, elements 1300 and 1302 may be iteratively performed at a low frame rate under control of the control component, for example one frame a second or one frame every ten seconds, and with the light-emitting elements in the illumination array at a low power setting, until an object is detected and the method proceeds to element 1304.

As indicated at 1300, an image of the field of view may be captured by the camera under direction of the control component. The control component obtains the image from the camera, and an object detection and motion tracking algorithm is applied to the image by the camera and illumination system to check if an object is in the field of view. Note that various object detection and motion tracking algorithms known in the art may be used. In at least some embodiments, the object detection and motion tracking algorithm may apply an object recognition algorithm to identify a specific type of object to be tracked. For example a face recognition algorithm may be applied to identify a detected object in the scene as a human face. In various applications, other object recognition algorithms may instead be used to identify various other types of objects. If the detected object is not identified as an object of the type to be tracked, the object may be ignored. At 1300, if no object has been detected, then the method may return to element 1300 to capture and analyze a next image. At 1300, if an object is detected, then the method proceeds to element 1304.

In at least some embodiments, elements 1304 through 1308 may be iteratively performed at a higher frame rate under control of the control component, for example 10, 15, or 30 frames per second or higher, and with the light-emitting elements in the illumination array selectively set at various power levels to selectively illuminate a detected object being tracked, until the object is no longer detected.

As indicated at 1304, once an object is detected, the control component may update the illumination array to selectively illuminate the detected object. In at least some embodiments, the camera and illumination system may analyze the image to determine region(s) of the image that include portions of the detected object. These regions are then mapped to one or more light-emitting elements in the illumination array that cover the corresponding region(s) of the field of view of the camera. In at least some embodiments, when an object is first detected at 1302, the camera and illumination system may predict direction and speed of motion of the detected object and use this prediction in mapping the object to the illumination array. Once the one or more light-emitting elements in the illumination array are determined, the control component may then selectively activate or increase the power to the one or more light-emitting elements to completely, but selectively, illuminate the object. Power to the other light-emitting elements in the illumination array may be lowered, if not already at low power.

As indicated at 1306, another image of the field of view is captured by the camera under direction of the control component at the current setting of the illumination array. The control component obtains the image from the camera, the object detection and motion tracking algorithm is again applied to the image by the camera and illumination system to track the object in the field of view, and the image is analyzed to determine which regions contain the detected object. At 1308, if the object is still detected, or if motion of the object is still detected, within the field of view of the camera, then the method returns to element 1304 to update the illumination array accordingly and capture a new image for analysis. At 1308, if there is a terminating condition, for example if the object, or motion of the object, is no longer detected in the field of view of the camera or if the method is automatically or manually terminated, then at 1310, if the method is to continue, the method returns to element 1300. Note that the frame rate may be dropped to a lower rate, and the power to all of the light-emitting elements in the illumination array may be set to low power. Otherwise, at 1310, the method is done.

FIG. 14 is a flowchart that illustrates a method for object detection and tracking, according to at least some embodiments of the camera and illumination system. The illumination array may be dynamically controlled by first starting the camera to capture images to look for an object in motion or entering the camera field of view. As indicated at 1400, the control component may set the illumination array to low power mode to obtain depth information. At this setting, the entire field of view of the camera may be illuminated by the illumination array, but with the light-emitting elements all set to low power. Alternatively, the illumination array may be turned off, and the system may rely on ambient illumination to obtain the image information for initially detecting object motion.

In at least some embodiments, elements 1402 and 1404 may be iteratively performed at a low frame rate under control of the control component, for example one frame a second or one frame every ten seconds, until an object is detected and the method proceeds to element 1406.

As indicated at 1402, an image of the field of view may be captured by the camera under direction of the control component. The control component obtains the image from the camera, and an object detection and motion tracking algorithm is applied to the image by the camera and illumination system to check if an object in motion is in the field of view. At 1404, if an object in motion is not detected, the method returns to 1402 to capture and analyze a next image. At 1404, if an object in motion is detected, then the method proceeds to 1406.

Once an object in motion has been detected, the image may be further processed by the camera and illumination system to determine what light-emitting elements in the illumination array should be turned on to illuminate the object. In at least some embodiments, this may involve tracking changes in object position between frames using motion estimation techniques. Once the light array illuminates the object in motion, the image data from consecutive frames may be processed by the camera and illumination system to extract relevant depth information. The camera and illumination system continues to check for changes in object position and update the illumination array accordingly to track and illuminate only the desired object. In at least some embodiments, motion detection and tracking may also be combined with additional tracking techniques such as object recognition techniques (e.g., face or human detection algorithms) to reduce false positives of other objects moving in the camera field of view such as trees, cars, etc. In at least some embodiments, the camera and illumination system may include a time out condition that turns off the light array or places it back in a low power mode if motion has not been detected beyond a threshold condition, e.g. for a specified period.

As indicated at 1406, once an object in motion has been detected in the field of view of the camera, the camera and illumination system maps the region(s) of motion from the image to the illumination array and updates the illumination array accordingly to selectively illuminate the detected object. In at least some embodiments, the camera and illumination system may predict direction and speed of motion of the detected object and use this prediction in mapping the object to the illumination array.

In at least some embodiments, elements 1408 through 1414 may be iteratively performed at a higher frame rate under control of the control component, for example 10, 15, or 30 frames per second or higher, and with the light-emitting elements in the illumination array selectively set at various power levels to selectively illuminate a detected object being tracked, until motion of the object is no longer detected or another terminating condition has been encountered.

As indicated at 1408, another image is captured, and motion is checked for. In at least some embodiments, another image of the field of view is captured by the camera under direction of the control component at the current setting of the illumination array. The control component obtains the image from the camera, the object detection and motion tracking algorithm is again applied to the image by the camera and illumination system to track motion of the object in the field of view.

At 1410, if motion is not detected, then the method goes to element 1412. At 1412, if a timeout condition has been reached (e.g., if motion has not been detected for a specified period), then the method may return to element 1400, where the illumination array is reset to low power mode and the method begins again to check for object(s) in the field of view of the camera at a lower frame rate. If the timeout condition has not been reached, then the method returns to element 1408 to capture another image at the current settings.

At 1410, if motion is detected, then the method proceeds to element 1414. As indicated at 1414, the camera and illumination system maps the region(s) of motion from the image to the illumination array and updates the illumination array to cover the new position of the tracked object. The method then returns to element 1408 to capture and analyze a next image.

Figure 15:
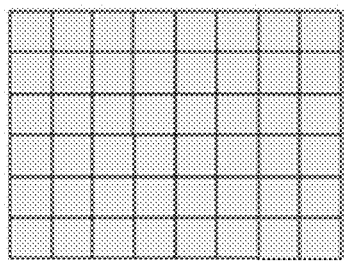
FIG. 15 graphically illustrates the method as illustrated in FIG. 14.
Figure 15:
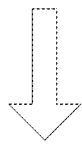
Figure 15:
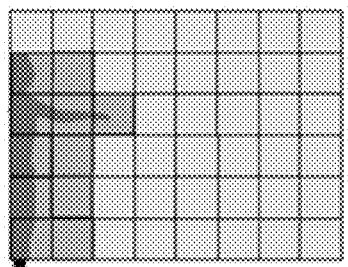
Figure 15:
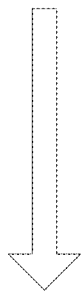
Figure 15:
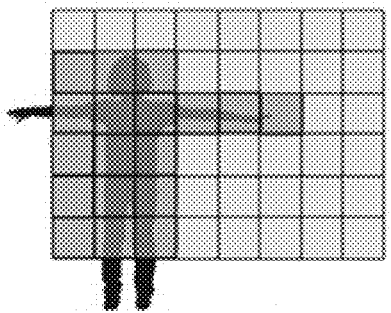

FIG. 15 graphically illustrates the method as illustrated in FIG. 14, according to at least some embodiments. FIG. 15 shows a field of view of a camera as covered by a two-dimensional array of illumination elements. The illumination array covers the entire camera field of view by subdividing the field of view into a two-dimensional grid. Each illumination element in the illumination array covers a particular region of the field of view of the camera. In at least some embodiments, the regions covered by adjacent illumination elements may slightly overlap to ensure continuous illumination coverage across the camera field of view.

FIG. 15 (*a*) corresponds to elements 1400 through 1404 of FIG. 14, and shows the field of view when illuminated by the light-emitting elements in the illumination array set at low power mode, or alternatively with the light-emitting elements in the illumination array turned off. No object is in the field of view.

FIG. 15 (*b*) corresponds to element 1406 of FIG. 14, and shows the field of view after initially detecting an object in motion (in this example, a human figure) in the field of view. The darker rectangles in the field of view represent regions corresponding to light-emitting elements in the array which have been activated or have had the power increased to selectively illuminate the detected object. Note that one or more regions may be illuminated according to prediction of motion of the object by the camera and illumination system.

FIG. 15 (*c*) corresponds to elements 1408 through 1412 of FIG. 14, and shows the field of view as updated to illuminate the new position of the object in motion (the human figure) as detected or predicted by the image analysis performed by the camera and illumination system.

Example Computing Device

Figure 16:
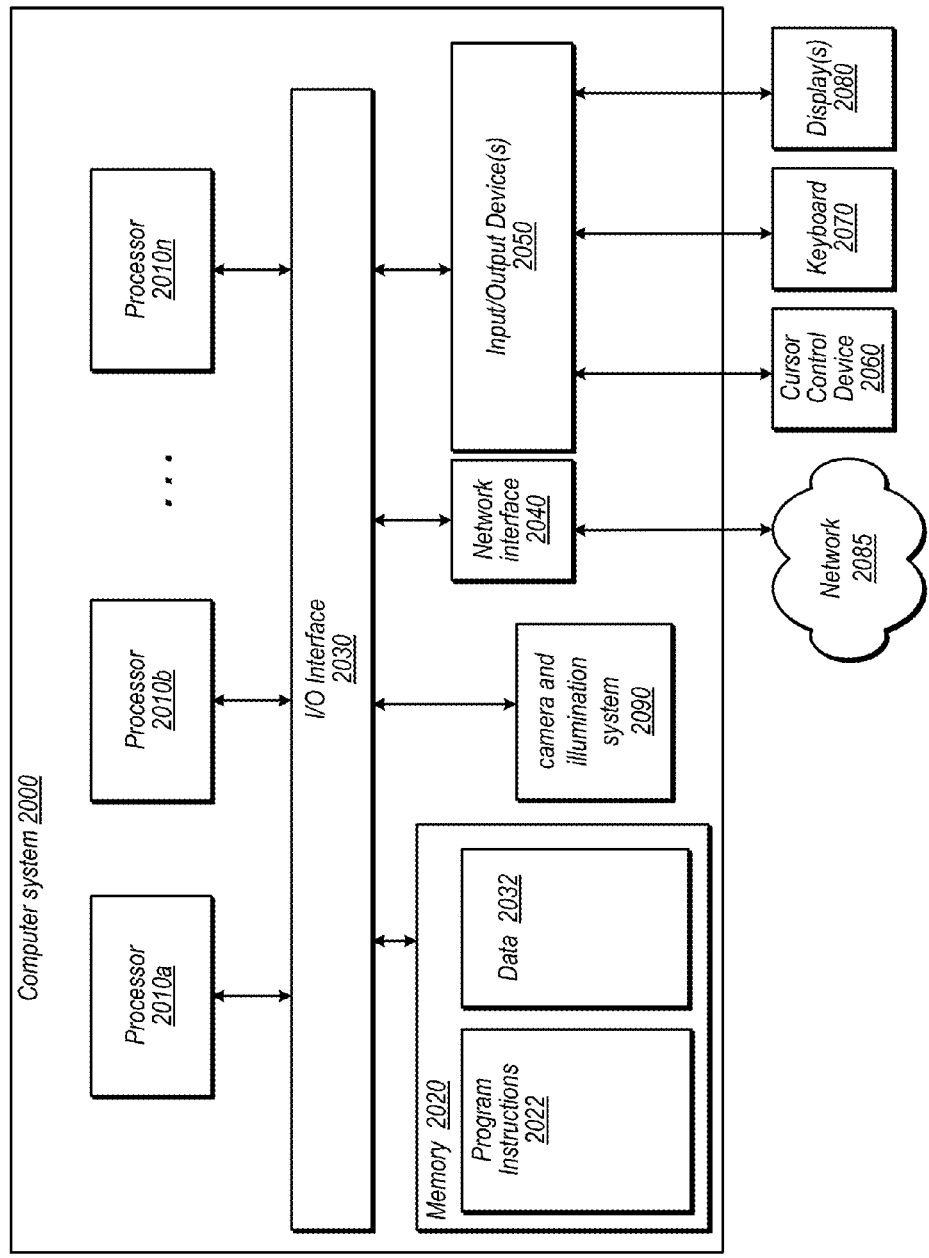
FIG. 16 illustrates an example computer system configured to implement aspects of the systems and methods for providing spatially dynamic illumination in camera systems as described herein.

FIG. 16 illustrates an example computing device, referred to as computer system 2000, that is configured to execute any or all of the embodiments of the systems and methods for providing spatially dynamic illumination in camera systems as described above. In different embodiments, computer system 2000 may be any of various types of devices, including, but not limited to, a personal computer system, desktop computer, laptop, notebook, tablet or pad device, slate, or netbook computer, mainframe computer system, handheld computer, workstation, network computer, a camera, a set top box, a mobile device, a wireless phone, a smart phone, a consumer device, video game console, handheld video game device, application server, storage device, a television, a video recording device, a peripheral device such as a switch, modem, router, or in general any type of computing or electronic device.

Various embodiments of the systems and methods for providing spatially dynamic illumination in camera systems, as described herein, may be executed on one or more computer systems 2000, which may interact with various other devices. Note that any component, action, or functionality described above with respect to FIGS. 2 through 15 may be implemented on one or more computers configured as computer system 2000 of FIG. 16, according to various embodiments.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. Computer system 2000 may also include one or more instances of an embodiment of a camera and illumination system 2090 as described above with respect to FIGS. 2 through 15 coupled to I/O interface 2030.

In some cases, it is contemplated that embodiments may be implemented using a single instance of computer system 2000, while in other embodiments multiple such systems, or multiple nodes making up computer system 2000, may be configured to host different portions or instances of embodiments. For example, in one embodiment some elements may be implemented via one or more nodes of computer system 2000 that are distinct from those nodes implementing other elements.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store program instructions 2022 and/or data 2032 accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions 2022 may be configured to implement various methods for processing images or other methods or data in a camera and illumination system as described above. In some embodiments, program instructions and/or data may be received, sent or stored upon different types of computer-accessible media or on similar media separate from system memory 2020 or computer system 2000. While computer system 2000 is described as implementing the functionality of functional blocks of previous Figures, any of the functionality described herein may be implemented via such a computer system.

In one embodiment, I/O interface 2030 may be configured to coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices attached to a network 2085 (e.g., carrier or agent devices) or between nodes of computer system 2000. Network 2085 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or accessing data by one or more computer systems 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown in FIG. 16, memory 2020 may include program instructions 2022, which may be processor-executable to implement any element or action described above. In one embodiment, the program instructions may implement the methods described above, such as the methods illustrated by FIGS. 13 and 14. In other embodiments, different elements and data may be included. Note that data 2032 may include any data or information described above.

Those skilled in the art will appreciate that computer system 2000 is merely illustrative and is not intended to limit the scope of embodiments. In particular, the computer system and devices may include any combination of hardware or software that can perform the indicated functions, including computers, network devices, Internet appliances, PDAs, wireless phones, pagers, video or still cameras, etc. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A method, comprising:
performing, by one or more computing devices:
 obtaining an image of a field of view captured by a camera;
 detecting, in the image, an object in the field of view of the camera;
 determining, in the image, one or more regions of motion of the object in the field of view of the camera;
 mapping the one or more regions of motion to an illumination array comprising a plurality of illumination elements, wherein the illumination array covers the field of view of the camera, wherein each illumination element in the illumination array comprises a respective light-emitting element configured to emit a beam of light and a respective optical element configured to affect the beam of light, and wherein each illumination element covers a particular region of the field of view of the camera; and
 adjusting the plurality of illumination elements in the illumination array to selectively illuminate one or more regions of the field of view of the camera corresponding to the one or more regions of motion of the object in the field of view of the camera.

2. The method as recited in claim 1, wherein said detecting, in the image, an object in the field of view of the camera comprises determining that the object is a specific type of object.

3. The method as recited in claim 1, wherein said determining one or more regions of motion of the object in the field of view of the camera comprises predicting motion of the detected object in the field of view of the camera and determining the one or more regions of motion of the object according to the predicted motion.

4. The method as recited in claim 1, further comprising, subsequent to said adjusting, iteratively performing:
 obtaining a new image of the field of view captured by the camera;
 determining motion of the object in the field of view of the camera according to the new image and at least one previous image; and
 updating the plurality of illumination elements in the illumination array according to the determined motion of the object to selectively illuminate one or more regions of the field of view of the camera corresponding to a new position of the object in the field of view of the camera.

5. The method as recited in claim 1, wherein said adjusting the plurality of illumination elements in the illumination array comprises activating or increasing output of one or more of the plurality of illumination elements in the illumination array that correspond to the one or more regions of motion of the object in the field of view of the camera.

6. The method as recited in claim 1, wherein said adjusting the plurality of illumination elements in the illumination array comprises:
 estimating depth of the object in the image; and
 decreasing or increasing output of one or more of the plurality of illumination elements in the illumination array according to the estimated depth of the object in the image.

7. An illumination device for camera systems, comprising:
an illumination array configured to illuminate a field of view of a camera, wherein the illumination array comprises:
 a plurality of illumination elements each configured to illuminate a particular region of the field of view of the camera, wherein each illumination element in the illumination array comprises:
  a respective light-emitting element configured to emit a beam of light; and
  a respective optical element configured to affect the beam of light so that the beam illuminates a respective region of the field of view of the camera; and
a control component coupled to the illumination array and configured to:
 detect regions of motion in images captured by the camera; and
 adjust the plurality of illumination elements in the illumination array to selectively illuminate different regions of the field of view of the camera according to the detected regions of motion.

8. The illumination device as recited in claim 7, wherein each optical element comprises a lens configured to transform the shape and divergence angle of the beam and a prism configured to shift direction of the transformed beam so that the beam covers the respective region of the field of view of the camera.

9. The illumination device as recited in claim 8, wherein the light-emitting elements are lasers.

10. The illumination device as recited in claim 9, wherein the lasers are vertical cavity surface emitting laser (VCSEL) technology lasers.

11. The illumination device as recited in claim 9, wherein the light-emitting elements are light-emitting diodes (LEDs).

12. The illumination device as recited in claim 9, wherein the light-emitting elements are configured to emit one of visible light and infrared light.

13. The illumination device as recited in claim 9, wherein the illumination array comprises an adjustor mechanism configured to adjust positioning of the optical elements in the illumination array under control of the control component.

14. The illumination device as recited in claim 7, wherein, to adjust the plurality of illumination elements in the illumination array, the control component is configured to activate, increase, or decrease output of one or more of the plurality of illumination elements in the illumination array that correspond to the one or more regions of motion of the object in the field of view of the camera.

15. The illumination device as recited in claim 7, wherein the illumination array is a one-dimensional array of illumination elements or a two-dimensional array of illumination elements.

16. A device, comprising:
a camera configured to capture images of a scene;
an illumination array configured to illuminate a field of view of the camera, wherein the illumination array comprises:
a plurality of illumination elements each configured to illuminate a particular region of the field of view of the camera, wherein each illumination element in the illumination array comprises:
a respective light-emitting element configured to emit a beam of light; and
a respective optical element configured to affect the beam of light so that the beam illuminates a respective region of the field of view of the camera; and
a control component coupled to the camera and to the illumination array, wherein the control component is configured to iteratively perform:
direct the camera to capture an image of the field of view;
detect one or more regions of motion of an object in the captured image;
map the detected one or more regions of motion to the plurality of illumination elements in the illumination array; and
adjust the plurality of illumination elements in the illumination array to selectively illuminate the one or more regions of the field of view of the camera corresponding to the one or more detected regions of motion of the object.

17. The device as recited in claim 16, wherein, to adjust the plurality of illumination elements in the illumination array, the control component is configured to activate, increase, or decrease output of one or more of the plurality of illumination elements in the illumination array that correspond to the one or more regions of motion of the object in the field of view of the camera.

18. The device as recited in claim 16, wherein the control component is further configured to:
estimate depth of the object in the image; and
decrease or increase output of at least one of the plurality of illumination elements in the illumination array according to the estimated depth of the object in the image.

19. The device as recited in claim 16, wherein, subsequent to said adjusting, the control component is further configured to iteratively perform:
obtain a new image of the field of view captured by the camera;
determine motion of the object in the field of view of the camera according to the new image; and
update the plurality of illumination elements in the illumination array according to the determined motion of the object to selectively illuminate one or more regions of the field of view of the camera corresponding to a new position of the object in the field of view of the camera.

* * * * *